United States Patent [19]

Iwasawa et al.

[11] Patent Number: 5,487,003
[45] Date of Patent: Jan. 23, 1996

[54] SIMULATION METHOD AND DEVICE FOR AIDING THE DESIGN OF A FLUID TORQUE CONVERTER

[75] Inventors: Kenjiroh Iwasawa; Hiroya Abe, both of Saitama, Japan

[73] Assignee: Honda Giken Kogyo Kabushiki Kaisha, Tokyo, Japan

[21] Appl. No.: 35,395

[22] Filed: Mar. 22, 1993

[30] Foreign Application Priority Data

Apr. 8, 1992 [JP] Japan ..................... 4-116950

[51] Int. Cl.$^6$ ..................... G06F 19/00; F16D 33/00; B60K 41/12
[52] U.S. Cl. ..................... 364/424.1; 364/426.01; 364/426.02; 192/3.29; 192/3.31; 192/3.58; 477/39; 477/38; 477/169; 60/361; 60/364; 60/367; 74/731.1
[58] Field of Search ..................... 364/424.1, 426.02, 364/426.01; 74/866, 867, 868, 731.1; 192/3.29, 3.3, 3.28, 3.31, 3.62, 3.58, 0.052, 0.032; 60/361, 364, 367; 477/39, 38, 169

[56] References Cited

U.S. PATENT DOCUMENTS

| | | | |
|---|---|---|---|
| 3,966,032 | 6/1976 | Koivunen | 192/3.3 |
| 4,186,557 | 2/1980 | Arai et al. | 60/361 |
| 4,596,322 | 6/1986 | Nishimura et al. | 192/3.31 |
| 4,638,897 | 1/1987 | Nishimura | 192/3.3 |
| 4,640,396 | 2/1987 | Nishimura | 192/331 |
| 4,693,347 | 9/1987 | Nishikawa et al. | 192/3.3 |
| 4,700,819 | 10/1987 | Nishikawa et al. | 192/3.62 |
| 4,843,918 | 7/1989 | Morimoto | 74/866 |
| 5,211,270 | 5/1993 | Tamura et al. | 192/3.29 |

Primary Examiner—Kevin J. Teska
Assistant Examiner—Jacques H. Louis-Jacques
Attorney, Agent, or Firm—Nikaido, Marmelstein, Murray & Oram

[57] ABSTRACT

A method and device for simulating properties of a fluid torque converter such as torque ratio, capacity factor and efficiency includes involving the execution of the steps of finding a plurality of parameters including a fluid passage angle and a fluid passage resistance from a vane profile of a vane wheel of a fluid torque converter, and simulating the properties of the fluid torque converter according to the parameters and an input and output torque relationship based on an angular momentum theory. The fluid passage angle is corrected according to a slip ratio between rotational speeds of input and output ends of the fluid torque converter for the purpose of accounting for the influences of the occurrence of flow separation. Good results can be obtained by correcting the outflow angle of a stator vane array by using a correction value given as a mathematical function of the slip ratio. Thus, the accuracy of simulation can be substantially improved with a minimum increase in the computer time.

8 Claims, 5 Drawing Sheets

SIMULATION METHOD AND DEVICE FOR AIDING THE DESIGN OF A FLUID TORQUE CONVERTER

TECHNICAL FIELD

The present invention relates to a simulation method and device for aiding the design of a fluid torque converter which is employed in an automatic transmission of a vehicle such as an automobile, and in particular to a method and device for simulating properties of a fluid torque converter according to various parameters obtained from a vane profile of a vane wheel used in the fluid torque converter and an input and output torque relationship based on the theory of angular momentum.

BACKGROUND OF THE INVENTION

The fluid torque converter used in the automatic transmission of a vehicle such as an automobile has such an important influence on the fuel economy and the power output of the vehicle that there is a strong need to develop a fluid torque converter which matches the performance of the vehicle for further improvement of the fuel economy and the power output of the vehicle.

It has been conventionally practiced to simulate such properties of a fluid torque converter as the torque ratio, the capacity factor and the efficiency by using a computer as an aid to the design of a fluid torque converter.

Conventionally, as a method for simulating the properties of a fluid torque converter, the velocity and pressure of the fluid are obtained from three-dimensionally distributed locations of the interior of the fluid torque converter by numerical analysis of fluid dynamics, and the values of torque at various parts of the fluid torque converter are computed so that such properties as the torque ratio and the capacity factor may be simulated according to such data. As another conventional simulation method, it was also proposed to compute the outflow angle at the stator vane array by using the method of discrete vortices, and conduct a simulation according to the thus obtained outflow angle and the theory of angular momentum.

However, according to such simulation methods, the properties obtained by the simulation often significantly deviate from the actual properties of the fluid torque converter obtained experimentally, and the properties of the fluid torque converter obtained by the simulation may not necessarily reflect the actual properties of the fluid torque converter.

Therefore, for optimum design of a fluid torque converter, in particular the optimum design of the vane profile, a large number of trial-and-error steps each involving the use of simulation are required, and even when such simulation is conducted by using a super computer, a considerable time is required for the entire process.

Since, in a three-element, one-stage fluid torque converter using a stator vane wheel of a commonly used type for motor vehicles in general, the fluid flow is a circulation flow in a closed space, and the configuration of the fluid passage and the vane profile are highly complicated, the precision of the computation based on such a simulation is often unacceptably low.

BRIEF SUMMARY OF THE INVENTION

In view of such problems of the conventional method for simulating properties of a fluid torque converter, a primary object of the present invention is to provide a method and device for simulating properties of a fluid torque converter which can highly accurately simulate properties of a fluid torque converter so that an optimum design of a practical fluid torque converter can be accomplished in a short time.

A second object of the present invention is to provide a method and device for simulating properties of a fluid torque converter which is simple, and does not require any excessive computer time.

A third object of the present invention is to provide a method and device for simulating properties of a fluid torque converter which can cover a relatively wide operating range of the fluid torque converter.

According to the present invention, these and other objects can be accomplished by providing a method for simulating properties of a fluid torque converter comprising the steps of finding a plurality of parameters including a fluid passage angle and a fluid passage resistance from a vane profile of a vane wheel of a fluid torque converter, and simulating properties of the fluid torque converter according to the parameters and an input and output torque relationship based on an angular momentum theory, characterized by that: the fluid passage angle is corrected according to a slip ratio of a rotational speed of an input end of the fluid torque converter to a rotational speed of an output end of the fluid torque converter.

The conventional simulation methods were not able to produce results sufficiently close to those obtained by experiments, and were therefore unsatisfactory because they did not account for the influences of flow separation which takes place at an end of a vane wheel. On the other hand, according to the present invention, a fluid passage angle obtained from a vane profile is corrected by a correction value according to the magnitude of the slip ratio, and is thereby made to more closely reflect the actual fluid passage angle which is affected by flow separation occurring at an end of the vane wheel. Thus, it is possible to obtain a result of simulation which is relatively free from errors, and substantially corresponds to the actual properties of a fluid torque converter obtained experimentally from an actual fluid torque converter. Therefore, by making use of such a simulation method, it is possible to achieve an optimum design of a fluid torque converter with minimum time and cost.

Since it can be accomplished simply, for instance, by introducing a correction value given as a mathematical function such as a cubic equation of the slip ratio, the necessary increase in the computer time is minimized, and the improved accuracy of simulation more than compensates for such a small increase in the computer time.

According to the experimental study conducted by the inventors, it was found that good results can be obtained when the fluid passage angle to be corrected consists of an outflow angle at a stator although reasonably good results can be obtained even when the outflow angle at the pump or the turbine is corrected by similar correction values.

This method can be conveniently implemented by using a device for simulating properties of a fluid torque converter, comprising: a data input unit for accepting data on a vane profile of a vane wheel of a fluid torque converter; a simulation parameter computing unit for computing a plurality of parameters including a fluid passage angle and a fluid passage resistance according to data on the vane profile of the vane wheel supplied from the data input unit; a fluid passage angle correcting unit for computing a correction value as a function of a slip ratio which is given as a ratio of a pump rotational speed to a turbine rotational speed of the fluid torque converter, and correcting the fluid passage angle computed by the simulation parameter computing unit according to the correction value; a simulation unit for simulating properties of the fluid torque converter according to the various parameters given from the simulation parameter computing unit, the fluid passage angle corrected by the fluid passage angle correcting unit, and a relationship between input and output torque of the torque converter; and an evaluation unit for comparing a result of simulation supplied from the simulation unit with a combination of target property data and producibility data, and evaluating the feasibility of the vane profile.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
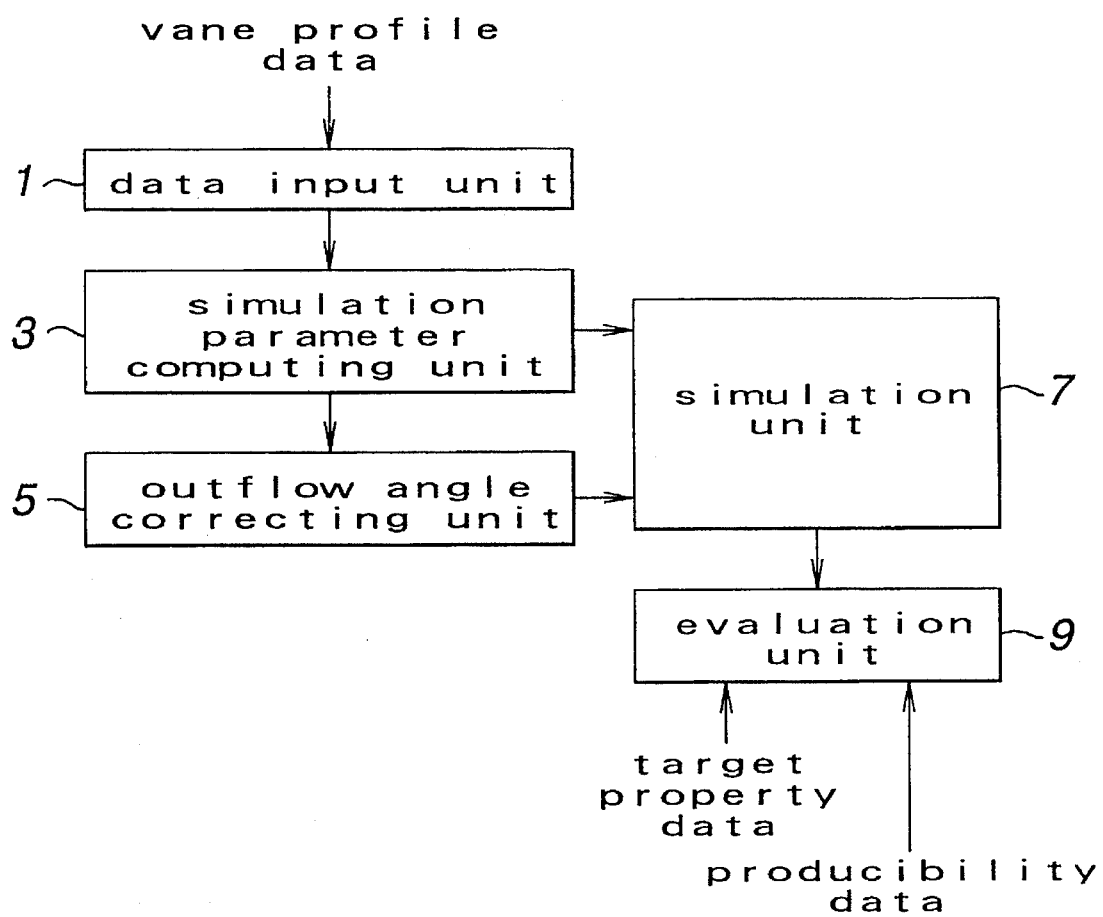
FIG. 1 is a block diagram showing an example of the device for simulating the properties of a fluid torque converter according to the present invention.

The method of simulating properties of a fluid torque converter according to the present invention can be executed on a normal computer, and an example of device for actually conducting this property simulating method is illustrated in FIG. 1. The property simulating device comprises a data input unit 1 for entering data on a vane profile of a vane wheel of a fluid torque converter therein, a simulation parameter computing unit 3 for computing a plurality of parameters including a fluid passage angle and a fluid passage resistance according to data on the vane profile of the vane wheel supplied from the data input unit 1, a fluid passage angle correcting unit 5 for computing a correction value as a function of a slip ratio which is given as a ratio of a pump or impeller rotational speed to a turbine rotational speed of the fluid torque converter, and correcting the computed fluid passage angle according to the corrected value, a simulation unit 7 for simulating properties of the fluid torque converter according to the various parameters given from the simulation parameter computing unit 3 and the fluid passage angle corrected by the fluid passage angle correcting unit 5 along with the input and output torque relationship based on the theory of angular momentum, and an evaluation unit 9 for comparing a result of the simulation supplied from the simulation unit 7 with a combination of target property data and producibility data (i.e., suitability of vane or blade for fabrication) and evaluating the feasibility of the obtained vane profile.

Figure 2:
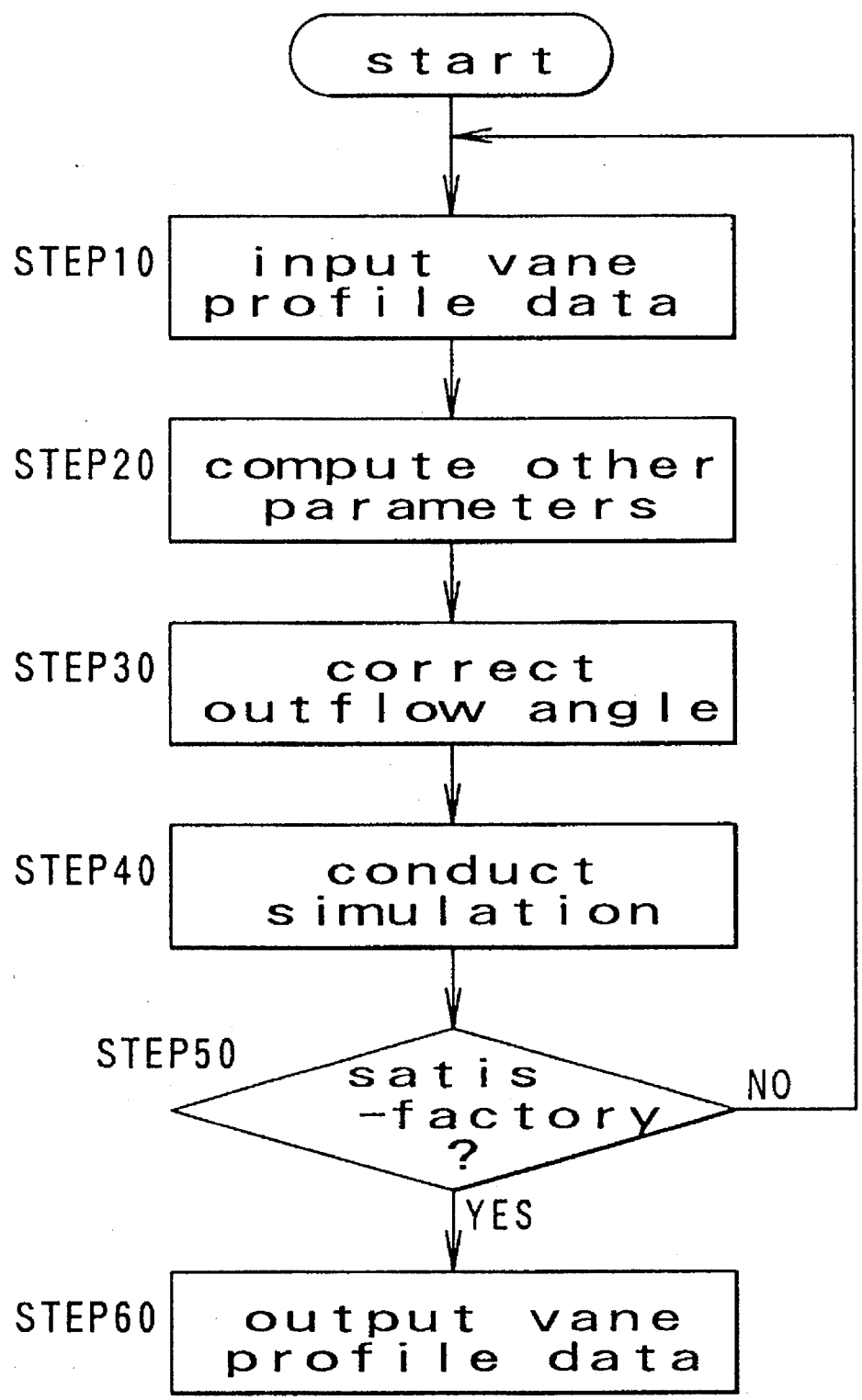
FIG. 2 is a flow chart showing the basic procedure for carrying out the method for simulating the properties of a fluid torque converter according to the present invention.

FIG. 2 illustrates a basic procedure for carrying out the method of simulating a fluid torque converter according to the present invention. In carrying out this simulation method, first of all, data on the vane profile of a vane wheel, for instance a stator or a reactor, of the fluid torque converter, or CAD data of this vane profile is numerically entered in the data input unit 1 (step 10), and various parameters such as the fluid passage angle, for instance the outlet angle of the stator vane array, and the fluid passage resistance are computed in the simulation parameter computing unit 3 from the input data on the vane profile (step 20).

Then, a correction value is computed as a mathematical function of the slip ratio, and the correction of the computed fluid passage angle is carried out in the fluid passage angle correcting unit 5 according to this correction value (step 30).

Thereafter, the simulation unit 7 carries out a simulation according to the various parameters computed by the simulation parameter computing unit 3 and the fluid passage angle corrected by the fluid passage angle correcting unit 5 along with the input and output torque relationship based on the theory of angular momentum (step 40).

Upon completion of the simulation, the evaluation unit 9 compares the result of simulation with the target property data and the producibility data, and determines the feasibility of the thus determined vane profile (step 50). If the vane profile is determined to meet criteria associated with the target property data and the producibility data, data on this vane profile is generated (step 60). On the other hand, if the vane profile is determined not to meet the criteria associated with the target property data or the producibility data, data on another vane profile may be entered for the next simulation process.

Now a specific example of the method for simulating properties of a fluid torque converter according to the present invention is described in the following.

Figure 3:
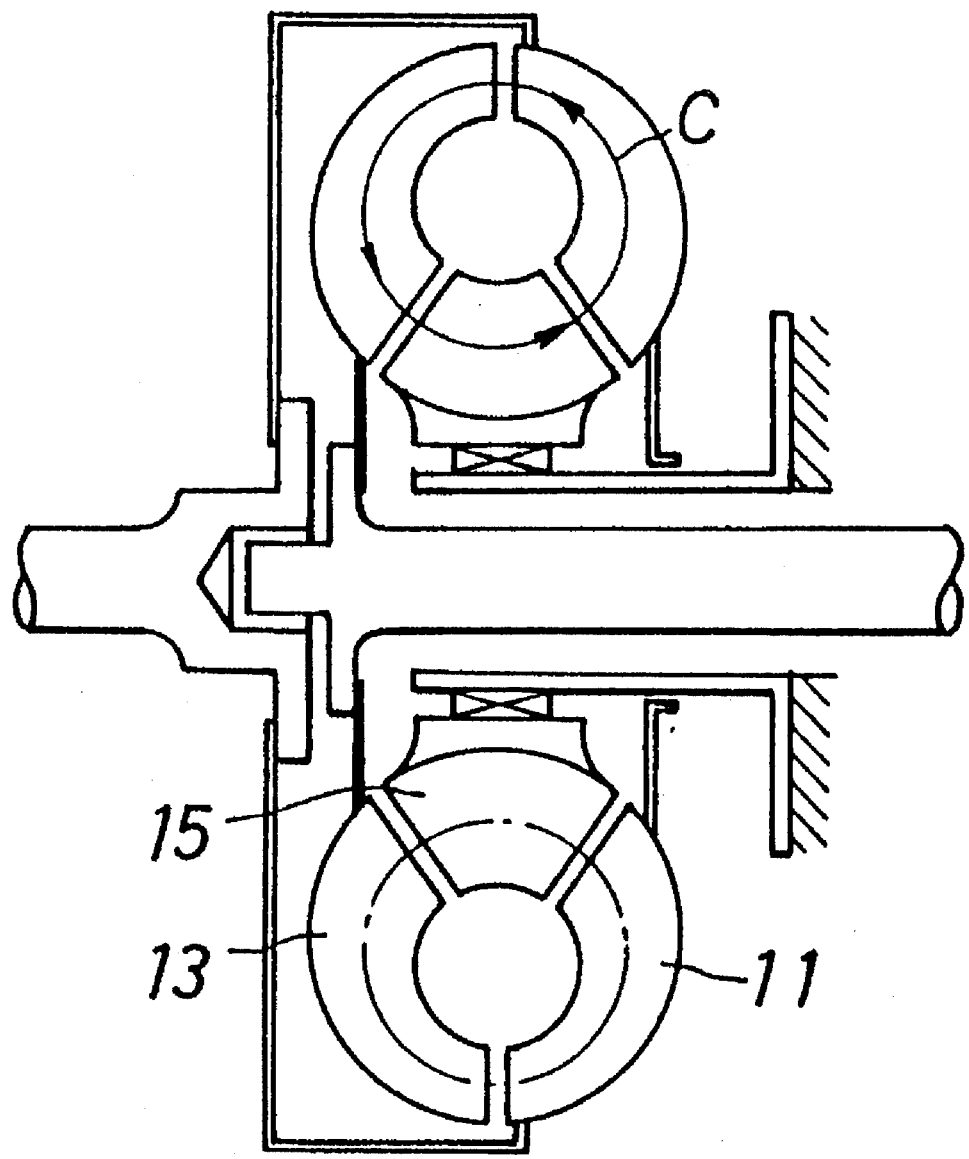
FIG. 3 is a schematic diagram showing the basic structure of a fluid torque converter to which the present invention may be applied.

The simulation method of the present invention is applied to a well-known three-element, one-stage fluid torque converter comprising a pump or impeller 11 serving as an input element, a turbine 13 serving as an output element, and a stator or reactor 15 serving as a reaction element as illustrated in FIG. 3. In this case, the fluid completely fills up the interior of the fluid torque converter, and circulates therein. It is assumed that the flow of the fluid is concentrated in a single flow line or so-called an average flow line which represents the entire flow of the fluid. It is also assumed that the meridional component of the average velocity C (m/sec) of the fluid, or the tangential component of the average velocity C (m/sec) of the fluid with respect to this average flow line is uniform over the entire average flow line.

A primary feature of the simulation method of the present invention can be found in the inclusion of a correction value for the outflow angle at the stator vane array obtained by modifying the outlet angle of the stator vane array according to the magnitude of the slip ratio e for eliminating the discrepancy between the result of simulation based on the theory of angular momentum with the result of experiment which may be caused by the occurrence of flow separation at an edge of a vane array in the torque converter.

Figure 4:
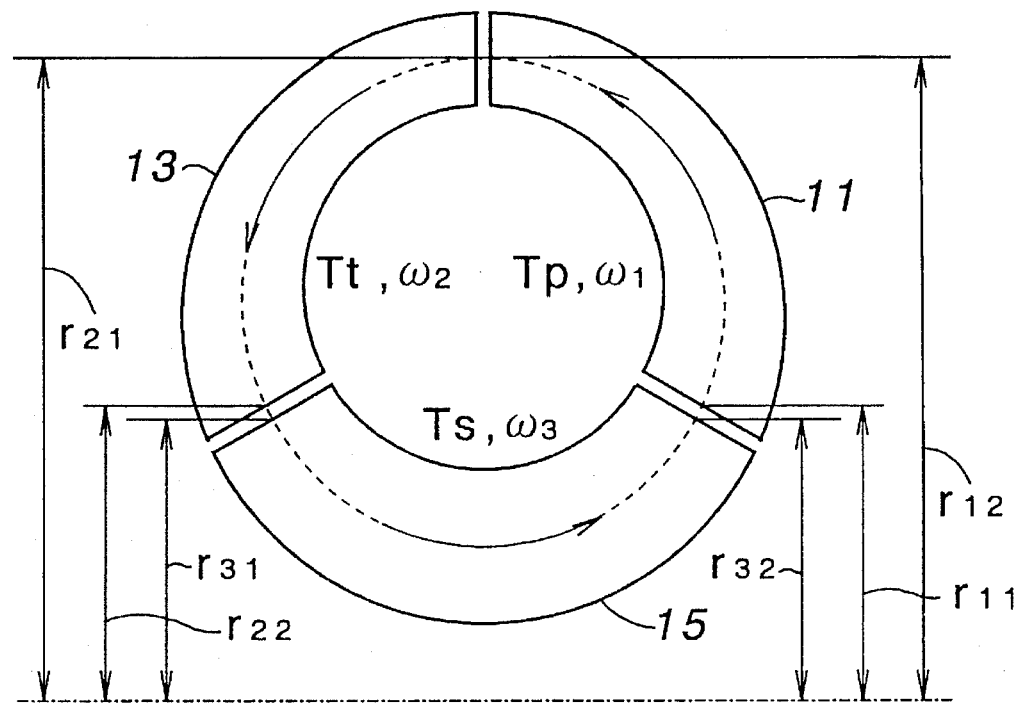
FIG. 4 is a diagram showing the fluid passage configuration of the fluid torque converter to which the present invention is applied.

In the three-element, one-stage fluid torque converter illustrated in FIGS. 3 and 4, $$Tp+Ts=Tt \qquad (1)$$

where Tp is pump torque, Tt is turbine torque, and Ts is stator torque. From Equation (1), the turbine torque Tt is greater than the pump torque Tp, and the torque is amplified between the pump 11 and the turbine 13.

In regard to power output, in a torque converter range, since the stator 15 does not rotate, it produces no power. Therefore, if the rotational speed of the pump is $\omega 1$, and the rotational speed of the turbine is $\omega 2$, (power of the pump)=$T_p \omega 1$ (power of the turbine)=$T_t \omega 2$.

Suppose that the efficiency of the torque converter is 100%. Then, $$T_p \omega 1 = T_t \omega 2 \qquad (2)$$

or $$T_t/T_p = \omega 1/\omega 2$$

Thus, it can be seen that if there is any slipping between the pump 11 and the turbine 13, $T_t > T_p$, or the torque is amplified as mentioned above.

$T_t/T_p = K$ is called torque ratio $T_t \omega 2/T_p \omega 1 = \eta$ is called efficiency, and $\omega 1/\omega 2 = e$ is called velocity ratio or slip ratio. In the present application, e is called as slip ratio.

In reality, in a fluid torque converter, each time the fluid flows from one vane wheel to another, for instance, from the pump 11 to the turbine 13, from the turbine 13 to the stator 15, or from the stator 15 to the pump 11, a collision at the inlet causes a loss, and fluid friction also inevitably causes a loss. Therefore, if the total loss is Tloss, the equation expressing the actual performance of the fluid torque converter can be given by the following equation.

$$T_p 1 - T_t \omega = T_{loss} \qquad (3)$$

Here, the produced torque can be given by:

torque=(angular momentum of the fluid as it flows out of a vane wheel)−(angular momentum of the fluid as it flows into the vane wheel), and the angular momentum is given as follows:

angular momentum=$(\Gamma/g)Qvr$ where $(\Gamma/g)$: density of the fluid (kg–s²/m⁴)

Q: flow rate (m3/sec)

v: circumferential component of the absolute velocity r: radial distance from the center of rotation Here, for simplification, if the radial dimensions are given as r11=r32=r1, r12=r21=r2, and r22= r31=r3, and the cross sectional area of the flow passage S (m²) is constant, the tangential component of the average velocity along the average flow line is constant throughout the average flow line. Further, it can be assumed that, in a vane wheel as illustrated in FIG. 4, the direction of flow relative to the vane wheel is identical to the angle of the vanes themselves when the fluid flows into and out of the vane wheel, as far as the circumferential component of the torque is concerned, the jet flow at the outlet end of the stator acts upon the inlet end of the pump, the jet flow at the outlet end of the pump acts upon the inlet end of the turbine, and the jet flow at the outlet end of the turbine acts upon the inlet end of the stator. Therefore, the pump torque Tp, the turbine torque Tt, and the stator torque Ts are given by the following equations:

$$\begin{aligned}
Tp &= \text{(jet flow at the pump outlet)} r2 - \\
&\quad \text{(jet flow at the stator outlet)} r1 \\
&= (\gamma/g)Q[(r2\omega_1 - C\alpha 2)r2 - (r1\omega_3 - C\alpha 1)r1]
\end{aligned} \qquad (4)$$

$$\begin{aligned}
Tt &= \text{(jet flow at the turbine outlet)} r3 - \\
&\quad \text{(jet flow at the pump outlet)} r2 \\
&= -(\gamma/g)Q[(r3\omega_2 - C\alpha 3)r3 - (r2\omega_1 - C\alpha 2)r2]
\end{aligned} \qquad (5)$$

$$\begin{aligned}
Ts &= \text{(jet flow at the stator outlet)} r1 - \\
&\quad \text{(jet flow at the turbine outlet)} r3 \\
&= (\gamma/g)Q[(r1\omega_3 - C\alpha 1)r1 - (r3\omega_2 - C\alpha 3)r3]
\end{aligned} \qquad (6)$$

The angles of the vanes r and a are known values determined by the vane profiles for each given torque converter. In Equations (3), (4) and (5), $\alpha$ ($\alpha 1$, $\alpha 2$, and $\alpha 3$) denotes tan $\alpha$ for the purpose of simplification.

However, the tangential component C of the average line velocity is not a known value, and it is necessary to know the value of the tangential component of the average line velocity. The tangential component of the average line velocity is given by Equation (2), and the torque loss $T_{loss}$ needs to be known to solve Equation (2).

In a torque converter, the fluid flowing out of a vane wheel does not flow into the next vane wheel entirely smoothly, and a certain amount of collision loss is inevitable. If collision occurs at the regions between the outlet end of the pump and the inlet end of the turbine, between the outlet end of the turbine and the inlet end of the stator, and between the outlet end of the stator and the inlet end of the pump, and the collision speed in these regions are $v_p$, $v_t$ and $v_s$, respectively, the energy E due to the difference in the velocities which gave rise to the collision is given by $$E=(\Gamma/2\ g)Qv^2.$$

Hence, the energy loss Ls due to the collision is given by the following equation:

$$\begin{aligned}
Ls &= (\gamma/2g)Q(v_p^2 + v_t^2 + v_s^2) \\
&= (\gamma/2g)Q [\{(r1\omega_3 - C\alpha 1) - (r1\omega_1 - C\alpha 1)\}^2 + \\
&\quad \{(r2\omega_1 - C\alpha 2) - (r2\omega_2 - C\alpha 2)\}^2 + \\
&\quad \{(r3\omega_2 - C\alpha 3) - (r3\omega_3 - C\alpha 3)\}^2
\end{aligned} \qquad (7)$$

Figure 5:
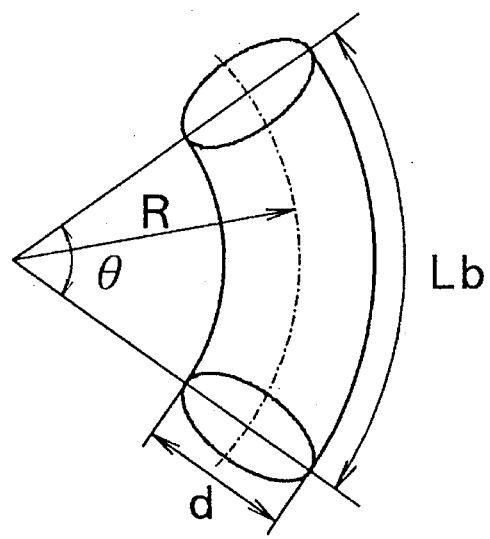
FIG. 5 is a diagram illustrating a model consisting of a curved tube for the fluid passage defined between each two adjacent vanes in the torque converter.

Now, consider the friction loss due to the relative velocity when the fluid flow passes through a vane wheel. If the fluid torque converter is represented by a model based on the assumption that the fluid passage can be represented by a space between each adjacent vanes, and can be considered as consisting of curved tubes as illustrated in FIG. 5, the head loss of each curved tube can be expressed by the following equation:

$$\begin{aligned}
h &= \phi b(v^2/2g) \\
&= \phi b(v^2/2g) + \lambda(Lb/d)(v^2/2g)
\end{aligned} \qquad (8)$$

where $\zeta$: coefficient of head loss due to the curving of the tube

Lb: length of each curved tube along its central line $\Lambda$: friction coefficient of the tube $\zeta b$: $\zeta + \Lambda \times (Lb/d)$: coefficient of total head loss The coefficient of the total head loss b in Equation (8) can be expressed by the Reynolds number Re, the radius of curvature of the tube R, the angle by which the tube extends θ, and the diameter of the tube d, and has been conventionally expressed as $$b=0.00515\beta\theta Re^{-0.2}(R/d)^{0.9}$$

where β is a mathematical function of the Reynolds number and the diameter of the tube. According to the present invention, this equation is expressed as given in the following.

$$b=A\theta(Re \times B)^D(R/d)^E \quad (9)$$

In this equation, B, D and E are experimentally obtained constants.

Also, it is assumed that A in equation (9) can be expressed as given in the following:

$$A=F+G(R/d)^H \quad (10)$$

In this equation, F, G and H are experimentally obtained constants for each given fluid passage of a fluid torque converter.

The sum of the aforementioned collision loss and the friction loss corresponds to the right hand side of Equation (3) or $T_{loss}$, and an equation for the tangential component of the average velocity of the fluid can be derived. Thus, by computing the tangential component C which changes according to the change in the slip ratio e, and computing the turbine torque Tt and the pump torque Tp therefrom, it is possible to simulate the torque ratio K=Tt/Tp, and the capacity factor $\tau$=Tp/(Nin/1000)$^2$ where Nin is the input rotational speed of the torque converter.

It is then necessary to derive the parameters for the simulation, and, first of all, the vane array inlet and outlet angle α is obtained by converting the coordinates of the three dimensional array of vanes developed in a three-dimensional space into two-dimensional coordinates approximately determined by the method of least mean square using a cubic function $$y(x)=ax^3+bx^2+cx+d$$

so as to remove the influences of localized corrections of the vane profile.

Now, the fluid passage resistance due to friction loss is determined by using the model of a curved tube for each of the passages defined by the threedimensional vane array developed in a three-dimensional space, determining the characteristics of the hypothetical curved tube by extracting three points from an inlet, an outlet and a middle point of the tube, and substituting these values into Equation (8) for the aforementioned friction loss.

By experimentally finding the correction value of the outflow angle of the stator vane array as a mathematical function of the slip ratio e, the outflow angle of the stator vane array which is one the simulation parameters is corrected.

The correction value ε for the outflow angle of the stator vane array can be determined by the following equation.

$$\epsilon=Ie^3+Je^2+Ke+L \quad (11)$$

where I, J, K and L are experimentally determined constants.

As can be seen from Equation (11), the correction value ε for the outflow angle of the stator vane array can be expressed by a cubic equation of the slip ratio e.

The ground for thus determining the correction value E for the outflow angle of the stator vane array is based on the experimental study conducted by the inventors in which the outflow angle of the stator vane array is varied, and such values of the outflow angle of the stator vane array which achieve good agreement between the results of experiment and simulation are found, and approximating it with a cubic function of the slip ratio according to the principle of least means square.

In the method of simulation according to the present invention, the outflow angle of the stator vane array actually used as a simulation parameter is obtained by adding the aforementioned correction value ε for the outflow angle of the stator vane array to the value $\theta_{cs}$ of the outflow angle of the stator vane array computed from the vane profile of the stator vane array. Therefore, the outflow angle of the stator vane array $\theta_{ss}$ can be expressed by the following equation.

$$\theta_{ss}=\theta_{cs}+\epsilon \quad (12)$$

Thus, the outflow angle of the stator vane array $\theta_{ss}$ actually used as a simulation parameter is adapted to the actual value by taking into account the influences of flow separation. Such a correction of the outflow angle of a vane array is most effective when it is carried out on the stator, but it can be also conducted on a pump or a turbine.

By doing so, the properties of a fluid torque converter such as the torque ratio, the capacity factor and the efficiency can be simulated in an accurate manner.

Figure 6:
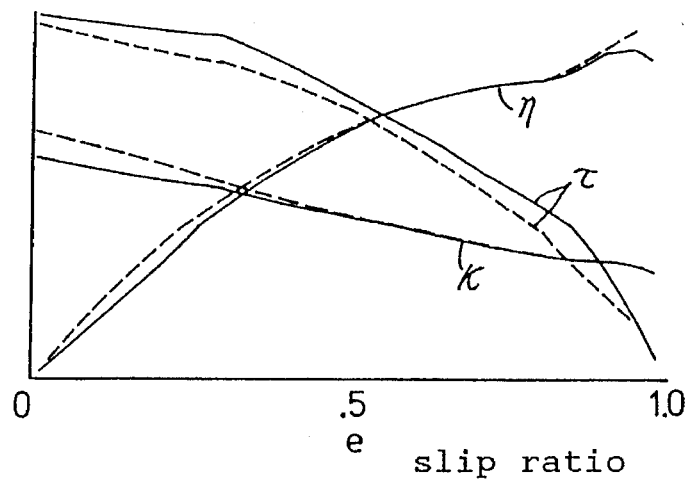
FIG. 6 is a graph showing the result of simulating the torque ratio, the capacity factor, and the efficiency of a fluid torque converter according to the simulation method of the present invention.
Figure 7:
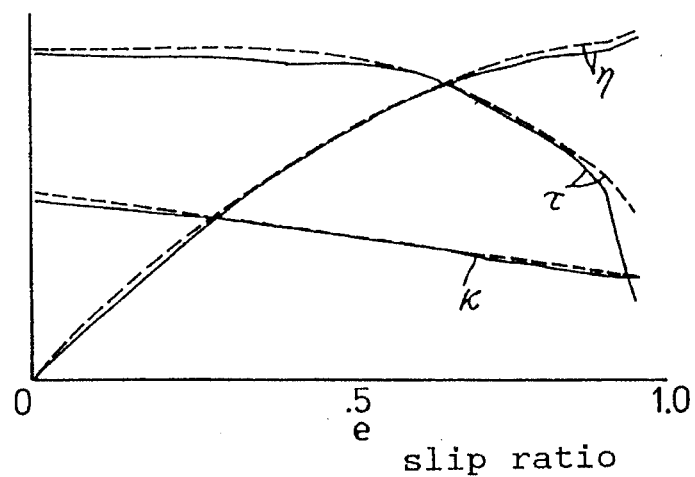
FIG. 7 is a graph showing the result of simulating the torque ratio, the capacity factor, and the efficiency of a fluid torque converter according to the simulation method of the present invention.

FIGS. 6 and 7 show the results of simulating the torque ratio K, the capacity factor τ and the efficiency η according to the simulation method of the present invention conducted on fluid torque converters of various dimensions, various degrees of ellipticity, and other variations of specifications, and those involving local modifications.

Figure 8:
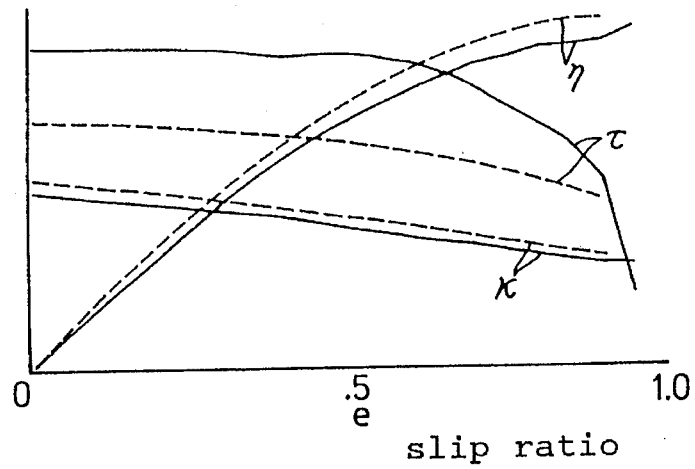
FIG. 8 is a graph showing the result of simulating the torque ratio, the capacity factor, and the efficiency of a fluid torque converter according to the conventional method.

FIG. 8 shows the results of simulating the torque ratio, the capacity factor and the efficiency of a fluid torque converter according to the conventional simulation method.

In FIGS. 6 through 8, the solid lines indicate the results of experiment while the broken lines indicate the results of simulation, and K, τ, η, and e denote the torque ratio, the capacity factor, the efficiency and the slip ratio (=speed ratio), respectively. It can be seen that the conventional method (FIG. 8) gives rise to a substantially greater discrepancy between the results of simulation and experiment as compared to the simulation method of the present invention (FIGS. 6 and 7). This is caused by the disagreement between the actual outflow angle from each of the vane arrays due to the occurrence of flow separation in the torque converter.

As can be understood from the above description, according to the method and device for simulating the properties of a fluid torque converter according to the present invention, the flow passage angle of a vane array such as the stator obtained from the vane profile is corrected by a correction value given as a mathematical function, in particular of a cubic function, of the slip ratio, and this allows the fluid passage angle used in the simulation to be closer to or adapted to the actual value which changes due to the occurrence of flow separation at an end of the vane array in the torque converter so that the result of the simulation of the properties of a fluid torque converter can be brought close to the actual properties of the fluid torque converter obtained experimentally, and can therefore be made less prone to errors. Therefore, the determination of the optimum configuration of a practical fluid torque converter can be made in a relatively short time without requiring a large number of trial-and-error steps.

Although the present invention has been described in terms of a specific embodiment thereof, it is possible to modify and alter details thereof without departing from the spirit of the present invention.

What we claim is:

1. A computer implemented method for-designing a fluid torque converter by simulating properties of the fluid torque converter comprising the steps of:

finding a plurality of parameters including a fluid passage angle and a fluid passage resistance from a vane profile of a vane wheel of a fluid torque converter;

correcting said fluid passage angle according to a slip ratio of a rotational speed of an input end of said fluid torque converter to a rotational speed of an output end of said fluid torque converter;

simulating properties of said fluid torque converter according to said parameters and an input and output torque relationship based on an angular momentum theory; and evaluating feasibility of said vane profile by comparing simulated properties of said fluid torque converter with a combination of target property data and producibility data, wherein said producibility data is indicative of suitability of said vane wheel for fabrication.

2. A simulation method according to claim 1, wherein said fluid passage angle is corrected by a correction value given by a mathematical function of said slip ratio.

3. A simulation method according to claim 2, wherein said mathematical function is a cubic function of said slip ratio.

4. A simulation method according to claim 1, wherein said fluid passage angle to be corrected consists of an outflow angle at a stator.

5. A device for designing a fluid torque converter by simulating properties of the fluid torque converter, comprising:

a data input unit for accepting data on a vane profile of a vane wheel of a fluid torque converter;

a simulation parameter computing unit for computing a plurality of parameters including a fluid passage angle and a fluid passage resistance according to data on said vane profile of said vane wheel supplied from said data input unit;

a fluid passage angle correcting unit for computing a correction value as a function of a slip ratio which is given as a ratio of a pump rotational speed to a turbine rotational speed of said fluid torque converter, and correcting said fluid passage angle computed by said simulation parameter computing unit according to said correction value;

a simulation unit for simulating properties of said fluid torque converter according to said various parameters given from said simulation parameter computing unit, said fluid passage angle corrected by said fluid passage angle correcting unit, and a relationship between input and output torque of said torque converter; and an evaluation unit for comparing a result of simulation supplied from said simulation unit with a combination of target property data and producibility data, wherein said producibility data is indicative of the suitability of said vane wheel for fabrication, and evaluating the feasibility of said vane profile.

6. A simulation device according to claim 5, wherein said fluid passage angle is corrected by a correction value given by a mathematical function of said slip ratio.

7. A simulation device according to claim 6, wherein said mathematical function is a cubic function of said slip ratio.

8. A simulation device according to claim 5, wherein said fluid passage angle to be corrected consists of an outflow angle at a stator.

* * * * *